US005696945A

United States Patent [19]

Seiler et al.

[11] Patent Number: 5,696,945

[45] Date of Patent: Dec. 9, 1997

[54] METHOD FOR QUICKLY PAINTING AND COPYING SHALLOW PIXELS ON A DEEP FRAME BUFFER

[75] Inventors: Larry D. Seiler, Boylston; Robert S. McNamara, Bolton; Christopher C. Gianos, Sterling, all of Mass.; Joel J. McCormack, Woodside, Calif.

[73] Assignee: Digital Equipment Corporation, Maynard, Mass.

[21] Appl. No.: 781,991

[22] Filed: Jan. 6, 1997

Related U.S. Application Data

[63] Continuation of Ser. No. 584,995, Jan. 11, 1996, abandoned, which is a continuation of Ser. No. 270,194, Jul. 1, 1994, abandoned.

[51] Int. Cl.[6] .................... G06T 1/60

[52] U.S. Cl. .................... 395/509; 395/497.04; 395/405; 395/501; 395/521; 345/189

[58] Field of Search .................... 395/501–503, 395/507, 509, 510, 515, 521, 513, 497.01, 497.04, 405, 432; 345/188, 189, 155, 190

[56] References Cited

U.S. PATENT DOCUMENTS 4,005,389 1/1977 Penzel .................... 395/497.04
4,745,407 5/1988 Costello .................... 345/188
5,303,200 4/1994 Elrod et al. .................... 365/230.05

OTHER PUBLICATIONS

IBM Microelectronics Catalog, RGB561, Workstation Graphics, Preliminary Rev. 1.0, Mar. 23, 1994, pp. i–66.

*Primary Examiner*—Kee M. Tung
*Attorney, Agent, or Firm*—Joanne N. Pappas; Gary E. Ross; Arthur W. Fisher

[57] ABSTRACT

A video subsystem of a computer processor is shown to include a graphics controller coupled to a video memory. A method for improving graphics performance for applications which use fewer bits per pixel than provided in the graphics subsystem includes the steps of rearranging the pixel and byte data in video memory such that corresponding bytes of different pixels are stored in different, simultaneously accessible locations of the video memory. With such an arrangement, accesses to video memory may be provided which utilize all of the available bytes of the video memory bus, thereby increasing the performance of the graphics operation. In addition, a graphics system having a plurality of independently operating memory controllers is shown to further improve graphics performance by ensuring that the video memory bus operates at full capacity.

10 Claims, 4 Drawing Sheets

METHOD FOR QUICKLY PAINTING AND COPYING SHALLOW PIXELS ON A DEEP FRAME BUFFER

This application is a continuation of application Ser. No. 08/584,995, filed Jan. 11, 1996 now abandoned which is a continuation of application Ser. No. 08/270,194 filed July 1, 1994 now abandoned.

FIELD OF THE INVENTION

This invention relates generally to the field of computer systems and more specifically to a method for storing graphics information in a computer system.

BACKGROUND OF THE INVENTION

As it is known in the art, a computer processing system generally includes a central processing unit for processing an instruction stream which is stored in a memory or on a disk. A variety of software applications may be executed simultaneously by the computer processing system. One of the applications controls the images that are displayed on a monitor coupled to the computer processing system. The computer processing system often includes specialized graphics hardware and software to control the image information that is displayed on the monitor.

Graphics hardware typically includes a graphics controller and a video frame buffer. The graphics controller receives commands from the computer processing system to control the manipulation of data within the frame buffer. The graphics controller may include logic to increase the performance of a variety of typical graphics functions such as copying data from memory to the frame buffer, drawing lines, or stippling data.

When the computer processor performs an operation, it updates the pixel data in the video RAMS. Graphics performance is typically measured by how fast the graphics controller can update or retrieve data in the video RAMs.

Typically, all pixels in the frame buffer that are displayed on the monitor are the same physical size, i.e. comprise the same number of bits per pixel. A graphics controller configured such that each displayed pixel is allocated 8 bits is hereafter called 'an 8 bit graphics system'. The bit addresses of successive displayed pixels in an 8 bit graphics system are p, p+8, p+16, etc. A graphics controller configured such that each displayed pixel is allocated 32 bits is hereafter called 'a 32 bit graphics system'. The bit addresses of successive displayed pixels in a 32 bit graphics system are p, p+32, p+64, etc.

Control bits may be associated with each displayed pixel to determine how the data bits of that pixel should be interpreted. These control bits may be contained with the pixel data itself, or may be contained in a separate area of memory. In a 32 bit graphics system, one value for the control bits may specify that bits 23:16 of the pixel specify the red color intensity, bits 15:8 specify the green color intensity, and bits 7:0 specify the blue color intensity. Another value for the control bits may specify that bits 7:0 should be used to index a 256 entry by 24 bit table. The 24 bits found in the table are then used to specify 8 bits apiece for red, green, and blue color intensities.

By using such control bits, a 32 bit graphics system can simultaneously display applications that are written for an 8 bit graphics system, as well as applications that require pixels with more than 8 bits of information. However, the performance of the application written for 8 bit pixels suffers when it is run on a 32 bit graphics system, because each pixel is physically allocated 32 bits, or four times the storage required in the 8 bit graphics system. Since many graphics operations are limited by the bus bandwidth to the video memory, some operations for 8 bit pixel applications may run as much as four times slower on a 32 bit pixel graphics system.

Referring briefly to FIG. 1, by way of illustration, a video memory 75 is shown to comprise 4 banks of memory, banks 80–83, each bank comprising 4 RAM devices. Each of the RAM devices stores 2 bytes of pixel data. As seen in FIG. 1, the video memory 75 stores 8 pixels of 32 bit graphic data.

Typically, when an 8 bit visual application is running in a 32 bit graphics system, only one byte of each 32 bit pixel includes data which is changed by most graphics operations. If the control bits are stored separately from the pixel data, the other three bytes of each pixel are completely unused. If the control bits are stored as part of the pixel data, then the control bits are used by the display hardware to control the interpretation of the rest of the pixel. These control bits are changed relatively infrequently, such as when an application pops up, pops down, or moves a window. The control bits are not typically changed by ordinary drawing operations to the window. As a result, even if the pixel data comprises control bits, ordinary drawing operations need read or write only 8 bits of each 32 bit pixel.

As shown in FIG. 1, assuming byte 0 is the relevant byte of data for the 8 bit application, in a 32 bit graphic system, only byte 0 of pixel 0 and pixel 1 may be accessed in a memory access. Thus only 16 bits of transaction, while 48 bits of the bus are unused. As a result, four memory accesses are required to banks 83 to read or write eight 8 bit pixels.

In contrast, in an 8 bit graphics system, an 8 bit graphics application may read or write eight 8 bit pixels in only one memory access. Thus, the same graphics hardware may provide two different performance results for the same graphics application depending on how many bits are allocated to each displayed pixel.

It would be desirable to provide a graphics system which would allow applications requiring fewer bits per pixel than are required by the configuration of the graphics system to be executed without diminishing the applications' performance.

SUMMARY OF THE INVENTION

In accordance with one aspect of the present invention, a method for improving the performance of a graphics application executing on a graphics subsystem, where the graphics subsystem has a video memory for storing graphics data, and where the graphic subsystem is configured to support applications having a first number of bits per pixel and the graphics application executes using a second, smaller, number of bits per pixel, includes the steps of storing pixels in the video memory such that corresponding bytes of different pixels of graphics data are stored in different, simultaneously accessible locations of the video memory. With such an arrangement, maximal graphics performance may be achieved for applications which utilize fewer bits per pixel then is available in graphics system by achieving full utilization of the video memory bus.

DESCRIPTION OF THE PREFERRED EMBODIMENT

Figure 2:
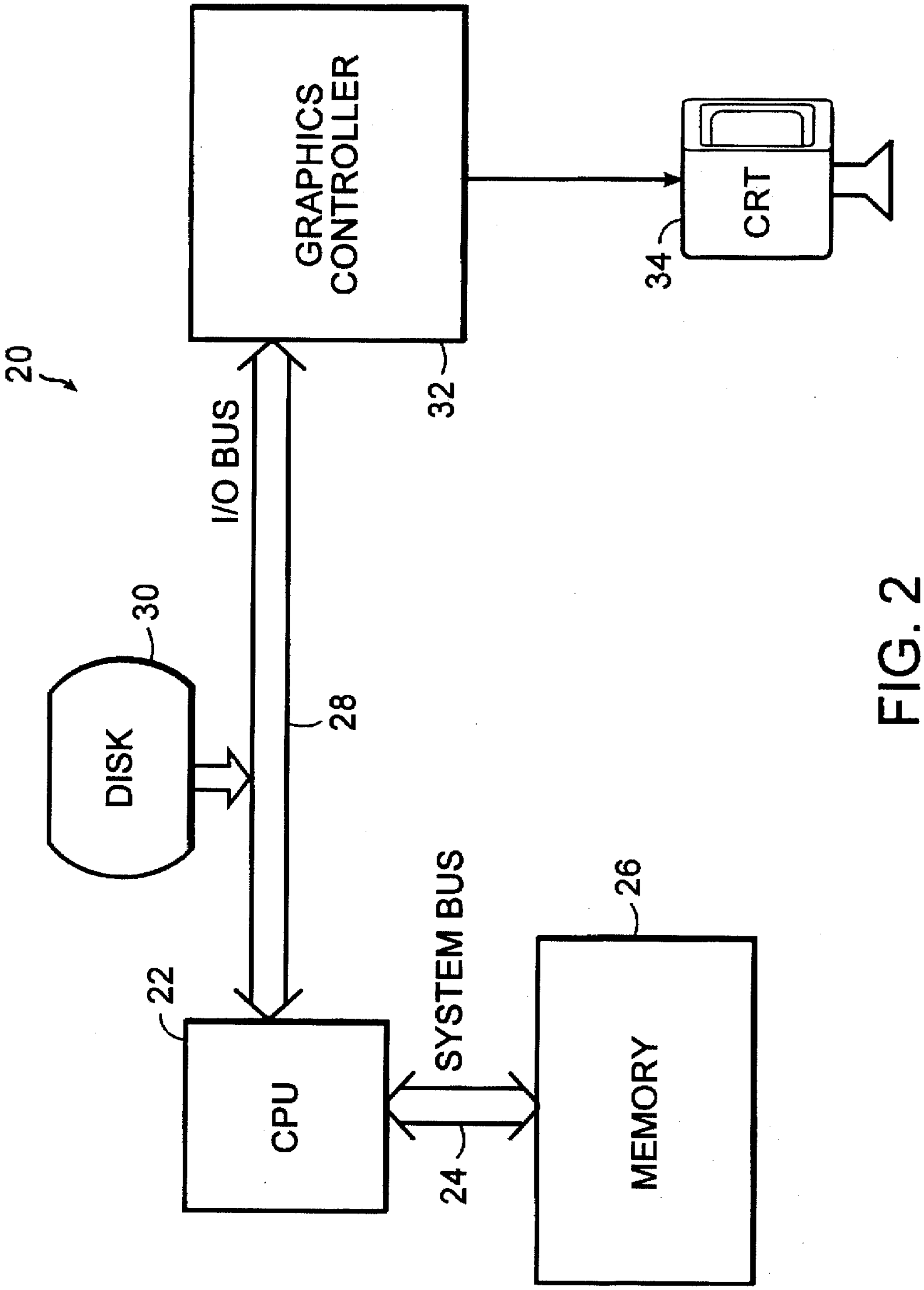
FIG. 2 illustrates a computer system for operation with the invention.

Referring now to FIG. 2, a computer system 20 according to the invention is shown to include a Central Processing Unit (CPU) 22, coupled via a system bus 24 to communicate with a memory 26. The CPU 24 is also coupled via an Input/Output (I/O) bus 28 to communicate with external devices such as a disk controller 30 or a graphics controller 32. The graphics controller 32 is coupled to provide image data to a Cathode Ray Tube (CRT) monitor 34.

During operation of the computer system 20, the CPU 22 operates on applications using an instruction stream stored in memory 26. Many of the applications run on the CPU 22 provide image data or drawing requests to be displayed on CRT 34. Generally a software program, known in the art as a graphics driver, controls the display of image data or drawing requests provided by different applications on the CRT by providing appropriate address, data, and drawing commands over the I/O bus 28 to the graphics controller 32. The commands may include commands to copy data from memory 26 to a memory in the graphics device 32, or commands such as line drawing, or stippling of graphics data to provide shading.

The I/O bus 28 is a 32 bit bus which is adapted to communicate through a defined protocol with external devices, such as a disk, console, etc. There are a variety of I/O busses currently available in the market, each of which have their own defined protocol. The I/O bus 28 used in one embodiment of the invention operates according to a TURBOChannel™ protocol, and thus an interface of the graphics device 32 is designed in accordance with the TURBOchannel™ protocol. The TURBOChannel™ bus is a high performance bus with a maximum bandwidth equal to 100 MBytes/sec. It is to be understood that this invention could be adapted by one of ordinary skill in the art to a system arrangement using another I/O bus protocol or by connecting the graphics controller 32 to the system bus.

Figure 3:
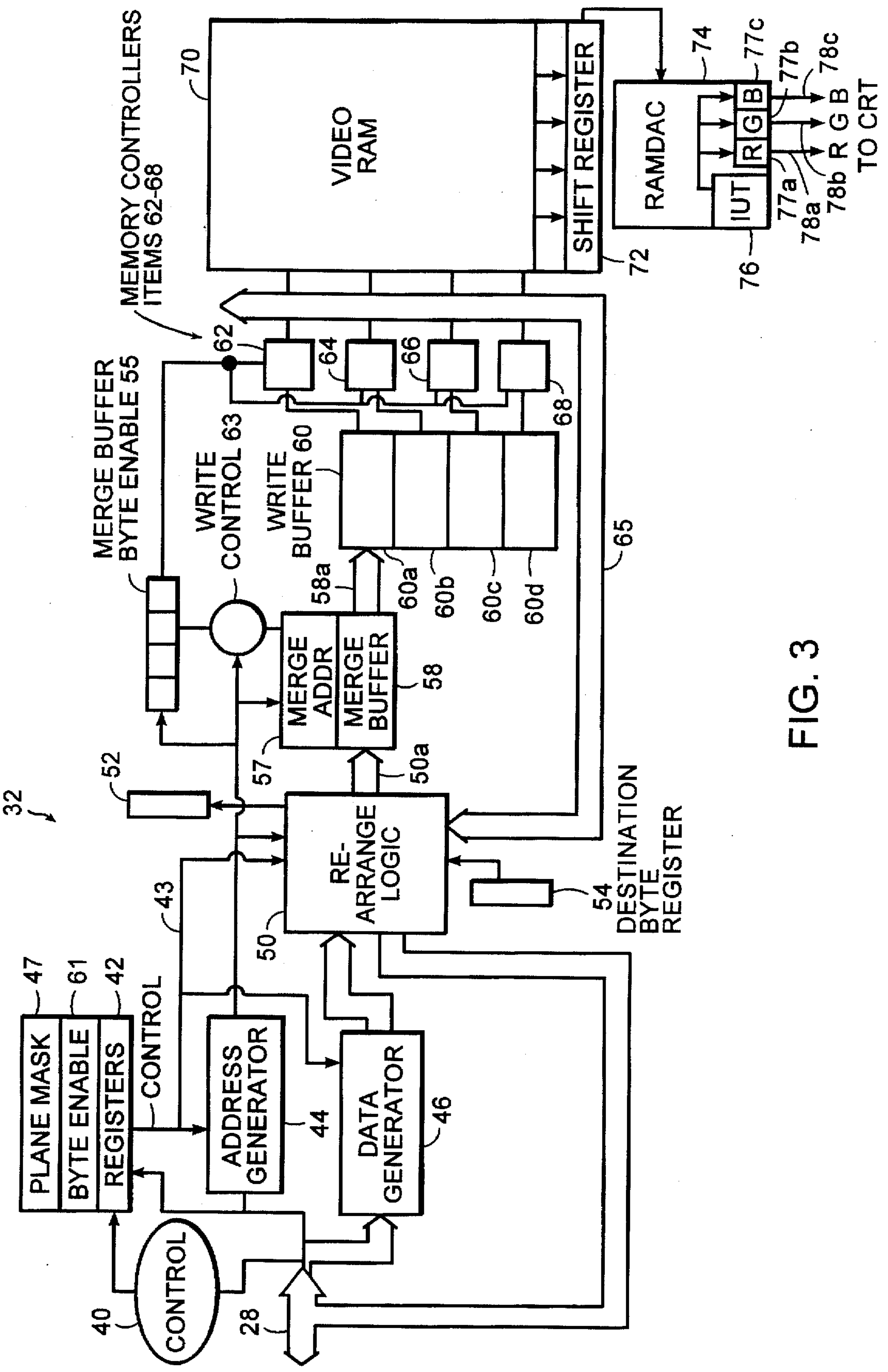
FIG. 3 is a block diagram of a graphics controller for us in the computer system of FIG. 2.

Referring now to FIG. 3, the graphics controller 32 of the present invention is shown to include control logic 40 for decoding the commands received on I/O bus 28. The control logic 40 is coupled to provide control signals to register logic 42. Register logic 42 includes a plurality of registers for storing information about the mode of operation, length of the scan line of the display, and other similar information of use to the graphics controller. One of the registers in register logic 42 is plane mask register 47. Plane mask register 47 stores information indicating which bits of data should be read or modified for each write transaction to memory.

Register logic 42 provides information via control data lines 43 to address generator 44. Data generator 46 is coupled to receive data from I/O bus 28, as well as data from registers 42. The data generator 46 provides data to rearrange logic 50, which may rotate data by an amount indicated in a source rotate register 52. The rearrange logic 50 passes data to merge buffer 58 via bus 50*a*.

The merge buffer 58 is a 64 bit buffer which reduces the number of writes to video memory by combining multiple, successive read or write requests into one memory access when possible. A merge buffer address register 57 stores the current video memory address of the data stored in merge buffer 58. The merge buffer address register 57 is coupled to receive an address from address generate logic 44.

Address generate logic 44 also provides output to a byte enable register 61. The byte enable register 61 stores enables indicating which bytes of data on bus 50*a* should be written to video memory 70. The byte enable register 61 is coupled to provide input to write control logic 63. Write control logic 63 controls updates to the data in merge buffer 58. Data is passed from merge buffer 58 onto write buffer 60 either when the merge buffer 58 is 'full', when the address generate logic 44 provides an address which does not relate to the address in merge address register 57, or when the address generate logic is idle.

The write buffer 60 comprises 4 16 bit buffers 60*a*–60*d*, each of which is coupled to a corresponding memory controller 62, 64, 66, and 68. The memory controllers 62–68 control the transfer of data between the write buffer 60, a video bus 65 and a video memory 70.

Data from the video memory 70 is periodically transferred to video shift register 72, and serially shifted out to a digital to analog converter (RAMDAC™) 74. The pixel data provided to RAMDAC™ is used to access a color Look Up Table (LUT) 76 which provides output data to digital-to-analog converters 77*a*, 77*b*, and 77*c*. The form of output data is dependent upon the mode in which the RAMDAC™ is operating. The digital to analog converters each send three analog signals, R, G, and B on lines 78*a*, 78*b*, and 78*c*, respectively, to the CRT.

Data in video memory 70 is read by the CPU (FIG. 1) via bus 65. The data on bus 65 is provided to the rearrange logic 50, which arranges the retrieved bytes in the appropriate order for output onto I/O bus 28.

The graphics controller 32 is capable of operating in a variety of configurations, including 32 bit and 8 bit graphics systems. In a 32 bit graphics system, each displayed pixel is 32 bits. The 32 bits comprise 3 fields: an overlay field, a control field, and a color data field. The overlay field comprises 4 bits of overlay information. A control field comprises 4 bits of control information which indicate to the graphics controller how the remaining 24 bits of color data should be interpreted (for example, 8 bits of red information, 8 bits of green information, 8 bits of blue information). Alternatively subsets of the bits of the color data field could be used to directly address the color look up table in the RAMDAC™.

In an 8 bit graphics system, displayed pixels are 8 bits that can be interpreted in a variety of ways. For example, the 8 bits can provide 8 bits of gray-scale information, or the 8 bits can be used to provide color information, with 3 bits providing red, 2 bits blue, 3 bits green information.

A video memory (also referred to as a 'frame buffer), that is configured to store 32 bits of pixel information is referred to as a 'deep' frame buffer. By having 32 bits per pixel of color information, there is a higher gradation between the colors that are available in the graphics system. A graphics application that uses only 8 bits per pixel for color gradation and that is executing on a graphics subsystem configured for 32 bits per pixel is referred to as using 'shallow' pixels.

The internal data paths of the graphics controller are 64 bits wide. The data path may provide either two 32 bit pixels, four 16 bit pixels, or eight 8 bit pixels. However, the video memory 70 may not change allocation when a shallow pixel application is currently running on the screen. Therefore, when an application is executing in a 32 bit graphics system, to be capable of supporting 8 bit and 16 bit graphics applications, the location of the pixels must be at the same location of the video RAM 70 for 8 bit pixel, 16 bit pixel and 32 bit pixel applications.

The address generator 44 and the rearrange logic 50 operate to ensure that for each graphics application, the pixel data is stored in the expected RAM device. The rearrange logic 50 is used to enable quick painting and copying of 'shallow' pixels in a 'deep' frame buffer, i.e. when only 8 bits of pixel information or 16 bits of pixel information are used by an application executing in a 32 bit graphics system.

Figure 1:
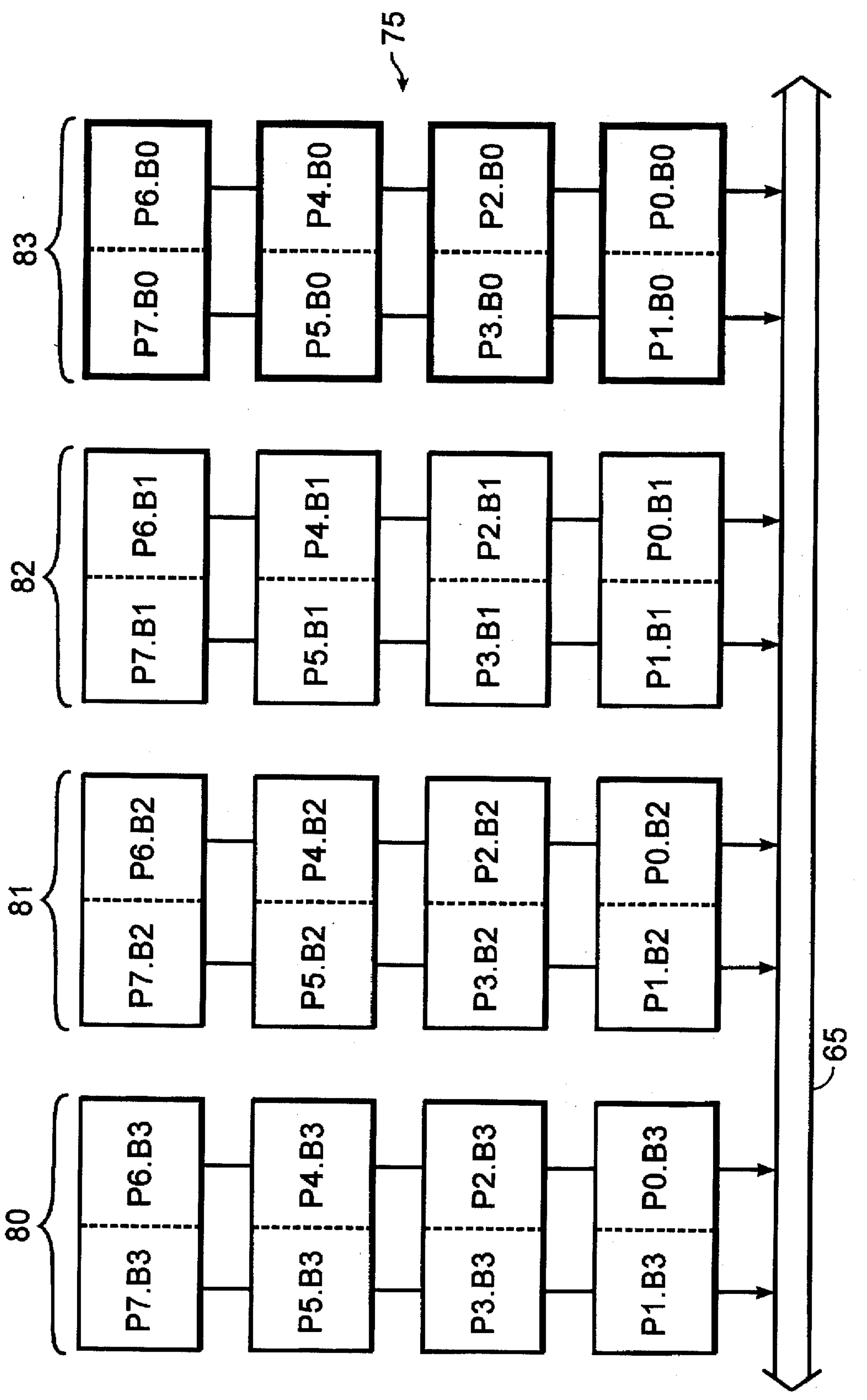
FIG. 1 (PRIOR ART)
FIG. 1 illustrates a prior art layout of 8 bit graphic pixels in a 32 bit graphic video memory.

Referring again briefly to the prior art video memory of FIG. 1, four banks of video RAM 80–83 are shown to each include 4 individual RAM devices each of which stores 2 bytes of pixel data. Therefore 16 individual RAM devices are used to provide data to a 64 bit bus.

Typically when an 8 bit graphic application is executing in a 32 bit graphics system, only one byte of each 32 bit pixel comprises pixel color data. By way of illustration, 4 banks of memory, banks 80–83 are shown to each include two bytes of pixel data. Assuming byte 0 is the byte of interest, due to the arrangement of pixels in video memory, in an 8 bit graphics system only byte 0 of pixel zero (P0.B0) and pixel one (P1.B0) are accessible during one memory access. As a result six of the bytes of the video memory bus 65 are unused. To obtain eight pixels of byte 0 data, four memory accesses to bank 83 are required.

Figure 4:
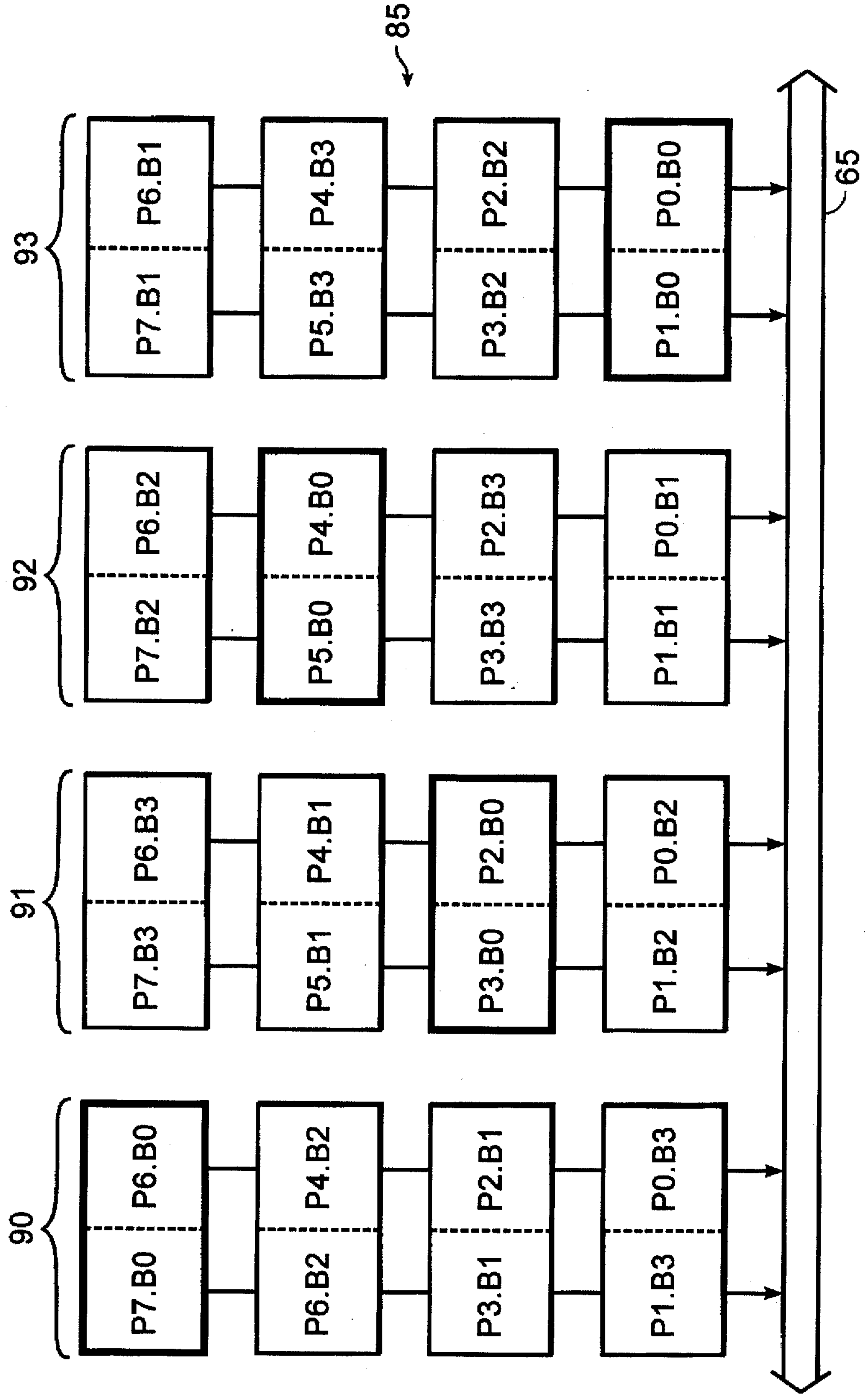
FIG. 4 illustrates an allocation of 8 bit graphic pixels in a 32 bit graphic application executed by the graphics controller of FIG. 3.

Referring now to FIG. 4, a video memory 85 is shown to comprise 4 slices of memory, 90–93, each of the slices further comprising 4 RAM devices. Each RAM device stores two bytes of pixel data, designated by P#.B#, representing the pixel number and the byte number within the pixel. Because there are 16 individual RAM devices, individual bytes of each pixel may be allocated to dedicated portions of a RAM device such that corresponding bytes of different pixels are allocated to different 'byte lanes' of the video bus 65. A 'byte lane' refers to the columns of video memory with respect to the video bus 65, and in the present system, comprising pixels having 8 bits per pixel and an output bus comprising 64 total bits, there are 8 distinct 'byte lanes' in video memory 85.

By rearranging the locations of bytes in consecutive lines of memory, the arrangement of pixels in memory is organized so that the location of a given byte (for example byte 0) resides in an accessible location of a RAM device for each pixel (0–7) of color data.

Thus all four slices of memory 90–93 may be accessed simultaneously to provide 64 bits of 8 bit pixel data to the video bus 65 with only one access of video memory 70, as opposed to the four accesses required by the prior art memory system shown in FIG. 1. With such an arrangement, the memory bus is fully utilized and therefore the performance of many 8 bit graphics application operations in a 32 bit graphics system is roughly quadrupled.

In addition, all four slices of memory 90–93 may be accessed simultaneously to provide 64 bits of 16 bit pixel data to the video bus 65 using only one access of video memory 70, as opposed to the two accesses required by the prior art memory system shown in FIG. 1. With such an arrangement, the performance of many 16 bit graphics application operations in a 32 bit graphics system is roughly doubled.

The bytes (0–3) of the respective pixels (0–7) are organized such that maximal use of video bus 65 is achieved. This is accomplished by ensuring that the individual pixels are rearranged such that byte 'n' of a pair of the 32 bit pixels is not stored in the same slice of video memory as byte 'n' of any other pair of pixels.

In the graphics system of FIG. 3, each memory controller 62–68 accesses one slice of video memory 90–93 to provide two bytes per memory reference. An arrangement as provided in FIG. 4 satisfies the above design criteria by ensuring that there are no instances in which byte 0 (or byte 1–3) of any of the pixels (0–7) is located in the same byte lane of bus 65, and thus requiring separate memory accesses. Because each memory controller may access its slice independently, and because each slice includes only one pair of pixels with byte n data, the memory controllers may be operated to provide 64 bits of byte n data with one memory access, and thus maximal utilization of bus 65 is achieved.

The organization of bytes of pixels provided in FIG. 4 enables 8 bit, 16 bit and 32 bit applications to be supported in a 32 bit graphics system. When accessing memory, or retrieving data from memory, the pixels and bytes on the bus 65 must be rearranged as a function of the type (i.e. number of bits) of the application in order to ensure that the correct memory devices are updated with data.

When operating in 32 bit graphic mode in a 32 bit graphics system, an example of how the data would be provided on the bus is shown below.

Bytes 0–3 of pixel 0 and pixel 1 are provided on bus 65 in the following order:

P1.B3, P0.B3, P1.B2, P0.B2, P1.B1, P0.B1, P1.B0, P0.B0.

Bytes 0–3 of pixel 2 and pixel 3 are accessed in the following order:

P3.B1, P2.B1, P3.B0, P2.B0, P3.B3, P2.B3, P3.B2, P2.B2.

Bytes 0–3 of pixel 4 and pixel 5 are accessed in the following order:

P5.B2, P4.B2, P5.B1, P4.B1, P5.B0, P4.B0, P5.B3, P4.B3.

Bytes 0–3 of pixel 6 and pixel 7 are accessed in the following order:

P7.B0, P6.B0, P7.B3, P6.B3, P7.B2, P6.B2, P7.B1, P6.B1.

An example of how data would be provided on the bus for a 16 bit application operating in a 32 bit graphics system is shown below. Bytes 0–1 of Pixel 0 through Pixel 3 would be provided on bus 65 in the following order:

P3.B1, P2.B1, P3.B0, P2.B0, P1.B1, P0.B1, P1.B0, P0.B0.

Bytes 0–1 of Pixel 4 through Pixel 7 would be provided on bus 65 in the following order:

P7.B0, P6.B0, P5.B1, P4.B1, P5.B0, P4.B0, P7.B1, P6.B1.

It should be noted that byte 2–3 information for pixels 0–7 may be obtained in a similar manner in only two memory accesses when operating on a 16 bit application in a 32 bit graphics system.

An example of how data would be provided on the bus for an 8 bit application retrieving byte 0 information and operating in a 32 bit graphics system is shown below:

P7.B0, P6.B0, P3.B0, P2.B0, P5.B0, P4.B0, P1.B0, P0.B0

Although in FIG. 4 the byte 0 information is highlighted, the organization of video memory 85 allows for all the byte 3 information of the 8 pixels to be provided at one time, or the byte 2 information, or the byte 1 information. With such an arrangement, an 8 bit graphic application can modify any of the bytes of the 32 bit pixel. The byte which is selected is stored in the source byte register 52, and destination byte register 54. By knowing the appropriate byte which is desired by the graphic application, the rearrange logic may rotate the video memory input or output by the proper amount to provide the pixel data in the appropriate order.

By rearranging the order of the bytes and pixels of the data on the bus 65 to an appropriate order depending on the number of bits of the graphic application, it is ensured that the appropriate data is provided to each RAM device for each memory access.

The method of organizing video memory to support graphic applications having fewer bits than the configured graphic system is not constrained to one or two flavors of 'shallow pixels' for one 'deep frame buffer'. Rather, for a frame buffer configured to support a depth of $2^n$ bits, divided into $2^m$ slices, all of the applications having a pixel width in the range of $2^{(n-m)}$ to $2^n$ can be manipulated in the above manner to provide full utilization of the video bus.

There are a variety of possible rearrangements of the bytes and pixels in the video memory which provide the above described advantages. Depending on the frequency of given applications, it may be desired to provide preference for one type of application (8 or 16 bit graphic) over another in the memory layout by arranging the bytes and pixels such that only a simple rotate function need to be performed on the retrieved/stored pixels for each access.

It should be obvious that this technique can be extended to any memory size desirable. Each 32-byte block of memory should be organized identically to the arrangement shown in FIG. 4, with pixel number relabelled appropriately. the rearrange logic 50 uses several of the low-order bits of the memory address to determine how data going to and from the memory controllers should be rearranged; higher address bits are ignored by rearrange logic 50.

Referring again to FIG. 3, when operating on an 8 bit application in 32 bit graphics mode, the graphics controller 32 operates as follows. Incoming pixel update commands are received on I/O bus 28, and address bits from address generate logic 44 are fed to rearrange logic 50. Because the pixels only comprise 8 bits of relevant pixel color data information, only one byte of each 32 bit pixel will include color data. Depending on the address of the pixel, the pixel data is re-arranged into the appropriate location for a 64 bit bus by rearrange logic 50.

In the event that the desired pixel/byte ordering may be obtained by merely rotating the output data retrieved from the video RAM, the amount of rotation is based upon a subset of bits in the address of the 32 bit pixel, and the byte of data which is selected in the source byte register 52. Otherwise, the hardware of the rearrange logic 50 may be designed to accommodate the desired organization of pixel and byte data.

The address of the current operation is stored in the merge address register 57. As the incoming data is provided on bus **50*a*, the byte enable register 61 provides information indicating which of the bytes of data on bus 50*a* are valid and should be written/read from memory. Each byte enable corresponds to one of the bytes of the 64 bit bus. The byte enable register is provided to the rearrange logic 50**.

In addition to data from the byte enable register 61, data from plane mask register 47 is also provided to the rearrange logic 50. The plane mask register 47 stores a plane mask, which determines which bits of each displayed pixel may be modified by a graphics application. Thus the byte enable provided by rearrange logic 50 and stored in merge buffer mask register 55 is a combination of the contents of the byte enable register 61, the plane mask register 47, the mode of operation, and the type of operation.

If the address of the data on bus **50*a* corresponds to the quadword address in merge buffer address register 57, and the merge buffer byte mask 55 indicates that the merge buffer location is free, the data on bus 50*a* is merged with the data in merge buffer 58**.

When the merge buffer 58 is 'full', i.e. either when there is no space in the merge buffer, when the incoming address does not correspond to the quadword address stored in merge address register 57, or when the address generate logic 44 is idle, the data from merge buffer 58 is shifted to write buffer 60. If at least one of the byte enables corresponding to the 16 bits to be stored in a write sub-buffer are set, both the 16 bit data as well as the byte enable bits are stored in the corresponding sub-buffer. As a result, each sub-buffer **60*a*–60*d* stores 16 bits of data from the merge buffer and 2 bits of byte enable, and is controlled by one of the memory controllers 62, 64, 66, and 68** respectively.

However, only sub-buffers having at least one of their corresponding byte enable bits set will receive data from the merge buffer. For example, if the data stored in merge buffer byte mask register 55 was 00 00 01 00, only sub-buffer **60*c* would be loaded with data from bus 58*a* and byte enable bits 01. Once sub-buffer 60*c* is loaded with data, memory controller 66 would use the byte enable bits corresponding to the loaded data to write the enabled bytes of data from sub-buffer 60*c*** to the appropriate location in video memory.

Because only memory controller 66 is used during the memory access, the remaining memory controllers are free to receive other pixels of incoming data over bus **58*a*** into their sub-buffers.

By allowing the memory controllers to operate completely independently, performance is vastly improved over prior art configurations in which the memory controllers act synchronously. In a synchronous memory controller system, it is conceivable that 4 memory controllers would be utilized to write only one byte of data to memory, where 3 memory controllers would be sitting idle awaiting completion of the write by the other memory controller. In synchronous memory controller systems, the performance of the system is limited by the number of physical bytes per pixel.

However, when the memory controllers are designed to act with complete independence, only those controllers that are actually accessing video memory are busy during the memory controller access period. Accordingly, the performance of such a graphics system is limited only by the number of pixels that are actually written, not the actual number of physical bytes per pixel.

For example, referring again to FIG. 4, assume a graphics application using 24 bits per pixel is executing on a 32 bit graphics system, and that memory controller 62, 64, 66 and 68 operate on byte 0, byte 1, byte 2 and byte 3 data respectively. Using a synchronous memory controller system, in order to write bytes 0–2 of each pixel, data from the merge buffer 60 and byte enables from byte enable register 61 would be shifted to the respective sub-buffers **60*a*–60*d*. Memory controller 68, would receive a byte enable of 00 from sub-buffer 60*d*, and sit idle during the memory access by the other memory controllers 62, 64 and 66. Memory controller 68 is not free to accept any more pixel data until the other controllers have finished updating the 3 bytes of pixel data. Thus, to write eight 24** bit pixels, four memory accesses must be made.

The need for 4 memory references may be seen with reference to FIG. 4. In the first memory access cycle, bytes 0–2 of Pixel 0 and Pixel 1 would be accessed. Thus in the first memory access, there would be no updates to memory slice 90. In the second memory access cycle, bytes 0–2 of Pixel 2 and Pixel 3 would be accessed. There would be no updates to memory slice 92. In the third memory access cycle, bytes 0–2 of Pixel 4 and Pixel 5 would be accessed. There would be no updates to memory slice 93. In the fourth memory access cycle, bytes 0–2 of Pixel 6 and Pixel 7 would be accessed. There would be no updates to memory slice 91.

However, in the preferred embodiment, with all memory controllers acting independently, none of the memory controllers need remain idle at any time. This is because when the byte enable for the given memory controller is equal to 00, the memory controller does not receive an entry for the given data, but is free to receive new data into its write buffer from merge buffer 58. As a result, to write eight 32 bit pixels, where only 24 bits of each 32 bit pixel are actually modified, may be accomplished in the equivalent of 3 memory accesses.

For example, referring again to FIG. 4, during the first memory access, bytes 0–2 of Pixel 0 and Pixel 1 would be accessed. In addition, byte I of Pixel 2 and Pixel 3 would be accessed. In the second memory access, byte 0 and byte 2 of Pixel 2 and Pixel 3 would be accessed, and byte 0 and byte 2 of Pixel 4 and Pixel 5 would be accessed. In the third memory access, byte 1 of Pixel 4 and Pixel 5 would be accessed, and byte 0–2 of Pixel 6 and Pixel 7 would be accessed.

Accessing fewer than all four bytes of each 32-bit pixel is quite common. Applications that use 24 bits of color information rarely modify the control bits, and so most operations read or write only three bytes of each 32 bit pixel. Some RAMDACs™ allow the 24 bits of color formation to be split into two 12 bit buffers; the control bits determine whether the top or bottom 12 bits should be displayed. The best performance would be obtained if these two 12-bit fields could be allocated so that they could be accessed as two separate 16-bit pixels, but this arrangement is precluded by some RAMDACs™. Nonetheless, if the RAMDAC allows one 12-bit field to be allocated to bits 0–11, and the other 12-bit field to be allocated to bits 12–23, an access to either of the 12-bit fields requires access to only two bytes of each 32 bit pixel. Thus an access of 8 pixels of 12-bit information may be accomplished with only two memory accesses as described with reference to the 16 bit applications described above.

Three dimensional applications use Z buffers and Stencil buffers. In the graphics controller shown in FIG. 3, each 32 bit Z/Stencil buffer pixel comprises two fields: an 8-bit stencil field, and a 24-bit Z value field. The majority of 3 dimensional operations only read and write the Z value field, and not the stencil field, so operate on only three bytes of each 32-bit pixel. Accordingly, an access of 8 pixels of Z information may be accomplished in 3 memory access cycles as described above with reference to FIG. 4.

The described graphics system utilizes the advantages of an atypical arrangement of pixel data in a video memory to increase the utilization of the video bus and thereby increase overall graphics system performance. In addition, graphics performance for some applications may be further improved by allowing for complete independence of the memory controllers which control the respective slices of video memory. Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What we claim is:

1. A method for improving the performance of a plurality of graphics applications executing on a graphics subsystem having a video memory apportioned into a plurality of slices for storing graphics data, where the graphic subsystem is configured to support applications having a first number of bits per pixel, and said graphics applications executes using a plurality of second, smaller, numbers of bits per pixel, comprising the step of:

storing pixels in said video memory such that corresponding bytes of different pixels of graphics data are stored in different, simultaneously accessible slices of said video memory, and such that adjacent bytes of the same pixels of graphics data are stored in different slices of said video memory.

2. A method for storing a plurality of pixels in a memory apportioned into a plurality of slices, with each slice storing a predetermined number of bytes of pixel data, said memory arranged to store a first portion of said plurality of pixels having a first number of bytes per pixel, and a second portion of said plurality of pixels having a second number of bytes per pixel, where said second number of bytes per pixel is less than or equal to said first number of bytes per pixel, said method for storing comprising the steps of:

arranging said first portion of pixels having a first number of bytes per pixel and said second portion of pixels having a second number of bytes per pixel into a plurality of groups of pixel data, where each of said groups of pixel data comprises said predetermined number of bytes of data and where each of said groups of pixel data comprises corresponding bytes of data from different pixels; and allocating said groups of pixel data to said plurality of slices such that groups of pixel data comprising corresponding bytes of data from said first portion of pixels are each stored in different ones of said plurality of slices.

3. The method according to claim 2, further comprising the step of:

allocating said groups of pixel data to said plurality of slices such that upon a read to said memory, said bytes of said first pixels and said bytes of said second pixels are provided in order to an interface bus.

4. The method according to claim 2, further comprising the step of:

rearranging said groups of pixel data on said video bus such that upon a write to memory, bytes of said first pixels and bytes of said second pixels are provided in order to said video memory.

5. An apparatus comprising:

a graphics processor;

a video bus, coupled to said graphics processor;

a memory apportioned into a plurality of slices for storing a plurality of pixel data, said pixel data comprising a first portion of pixel data having a first number of bytes per pixel and a second portion of pixel data having a second number of bytes per pixel, where corresponding bytes of different pixels of graphics data are stored in different, simultaneously accessible slices of said memory and where adjacent bytes of the same pixels of graphics data are stored in different slices of said video memory.

6. The apparatus of claim 5, further comprising:

a merge buffer, coupled to said graphics processor for combining successive writes to said memory;

a plurality of controllers, coupled to said merge buffer, each of said plurality of controllers for independently controlling storing of data in a corresponding one of said plurality of slices of said memory.

7. An apparatus comprising:

means for providing a plurality of pixel data on a pixel bus;

a plurality of memory controllers, each coupled to said means for providing pixels, each of said plurality of controllers including a dedicated buffer for storing a portion of said pixel data from said pixel bus;

a memory coupled to said plurality of controllers, said memory apportioned into a plurality of slices corresponding to said number of dedicated buffers, each slice receiving data from a corresponding one of said dedicated buffers, where reads and writes to each of said slices are independently controlled by said plurality of controllers.

8. The apparatus of claim 7, further comprising:

a byte mask register, coupled said means for providing pixel data, said byte mask register comprising a plurality of byte enables corresponding to the number of bytes of pixel data on said pixel bus, said plurality of byte enables apportioned into a plurality of groups of byte enables responsive to said number of slices of memory, each of said groups of byte enables stored in a corresponding one of said dedicated buffers for enabling an associated memory controller to operate on data in said corresponding buffer.

9. The apparatus of claim 8 further comprising:

means, responsive to said byte mask register, for selective storage of portions of said pixel data in said dedicated buffers.

10. The apparatus of claim 7, further comprising:

means, coupled to said means for providing pixel data, for rearranging said individual pixels on said pixel bus such that said pixel data is stored in said memory such that corresponding bytes of said pixels data are each stored in simultaneously accessible locations of said memory.

* * * * *